Figure 1:
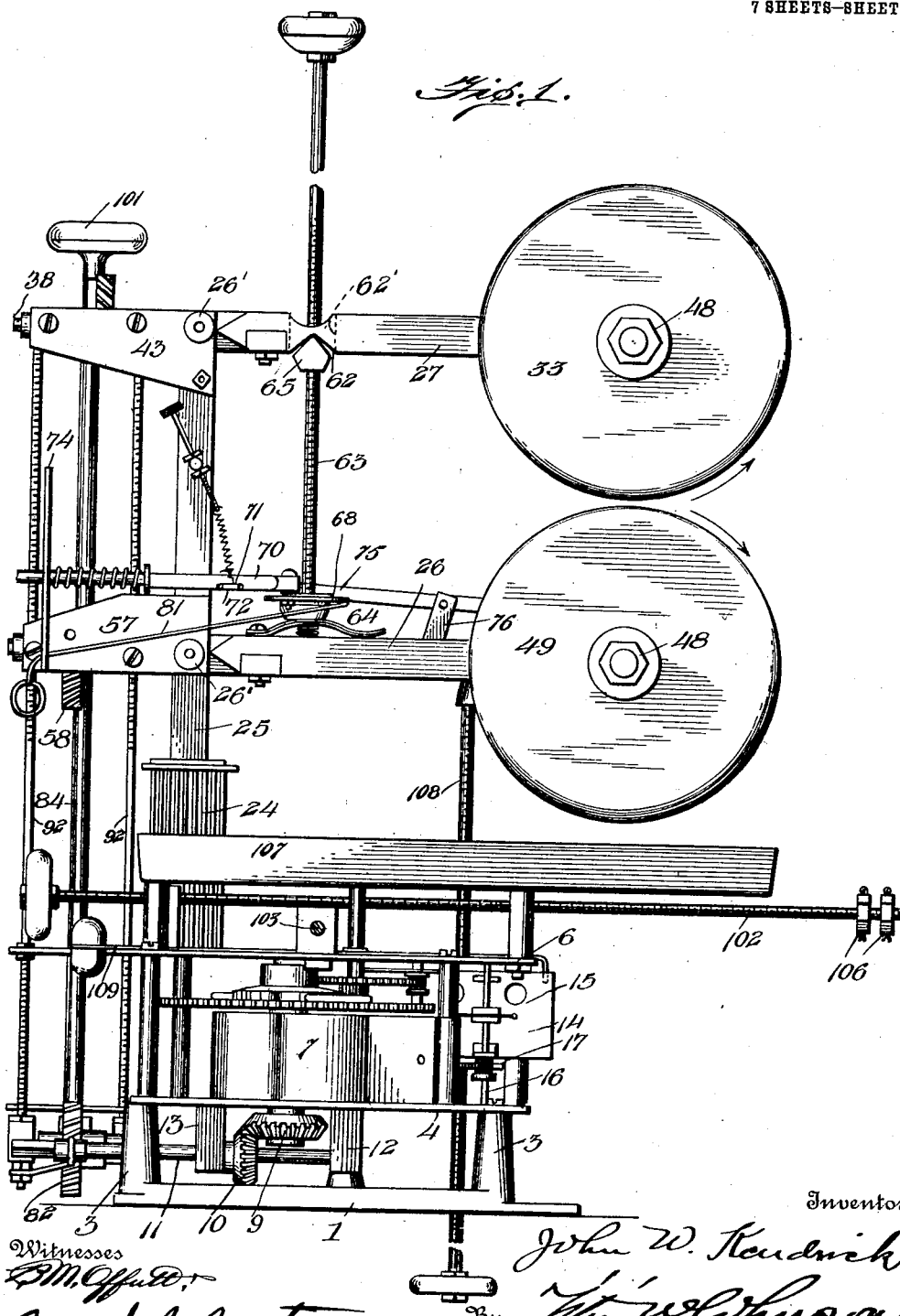

J. W. KENDRICK.
ARC LAMP.
APPLICATION FILED FEB. 17, 1910.

1,007,003.

Patented Oct. 24, 1911.
7 SHEETS—SHEET 1.

Witnesses
B. M. Offutt
Frank G. Brereton

Inventor
John W. Kendrick
By ——— Johnson
Attorney

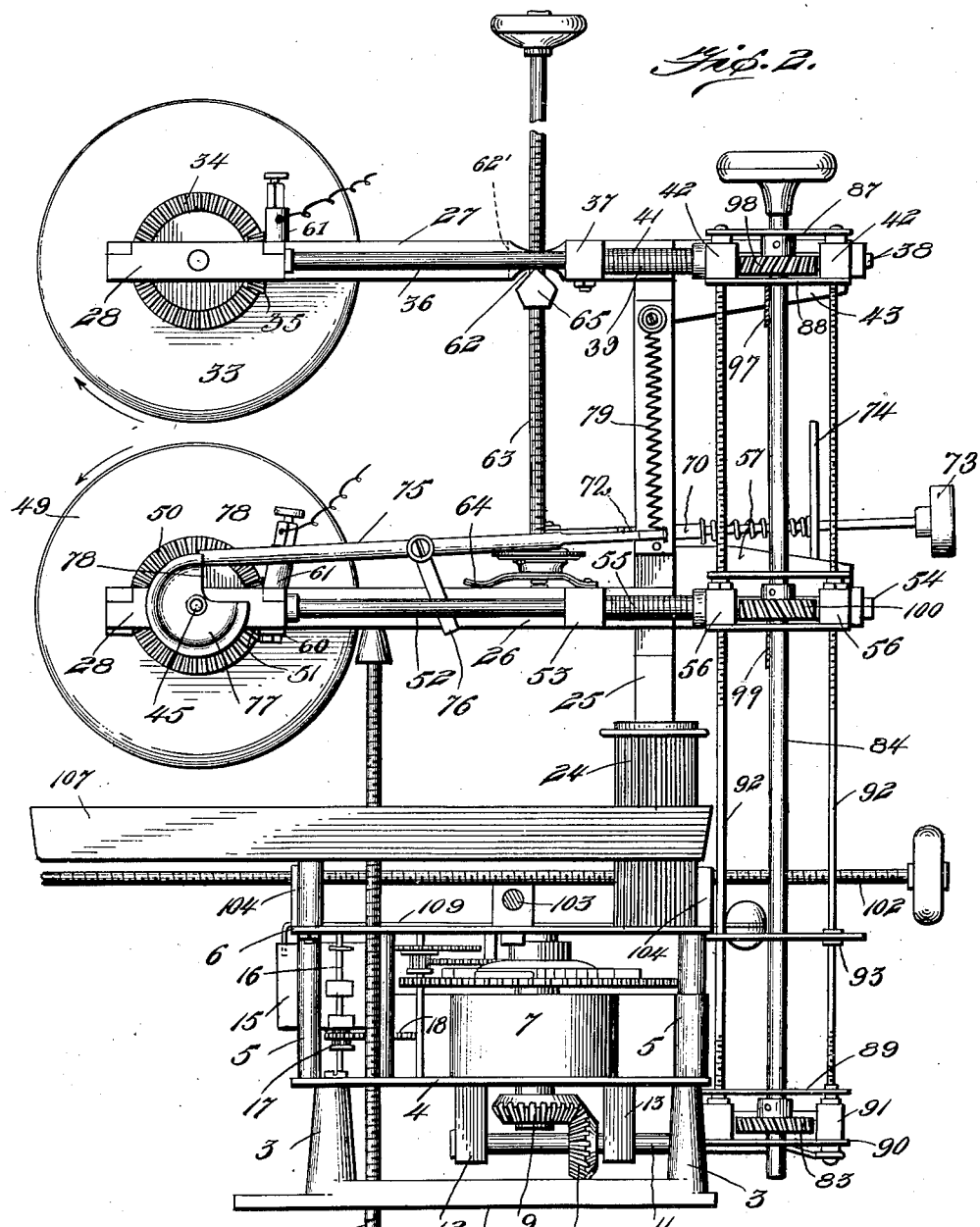

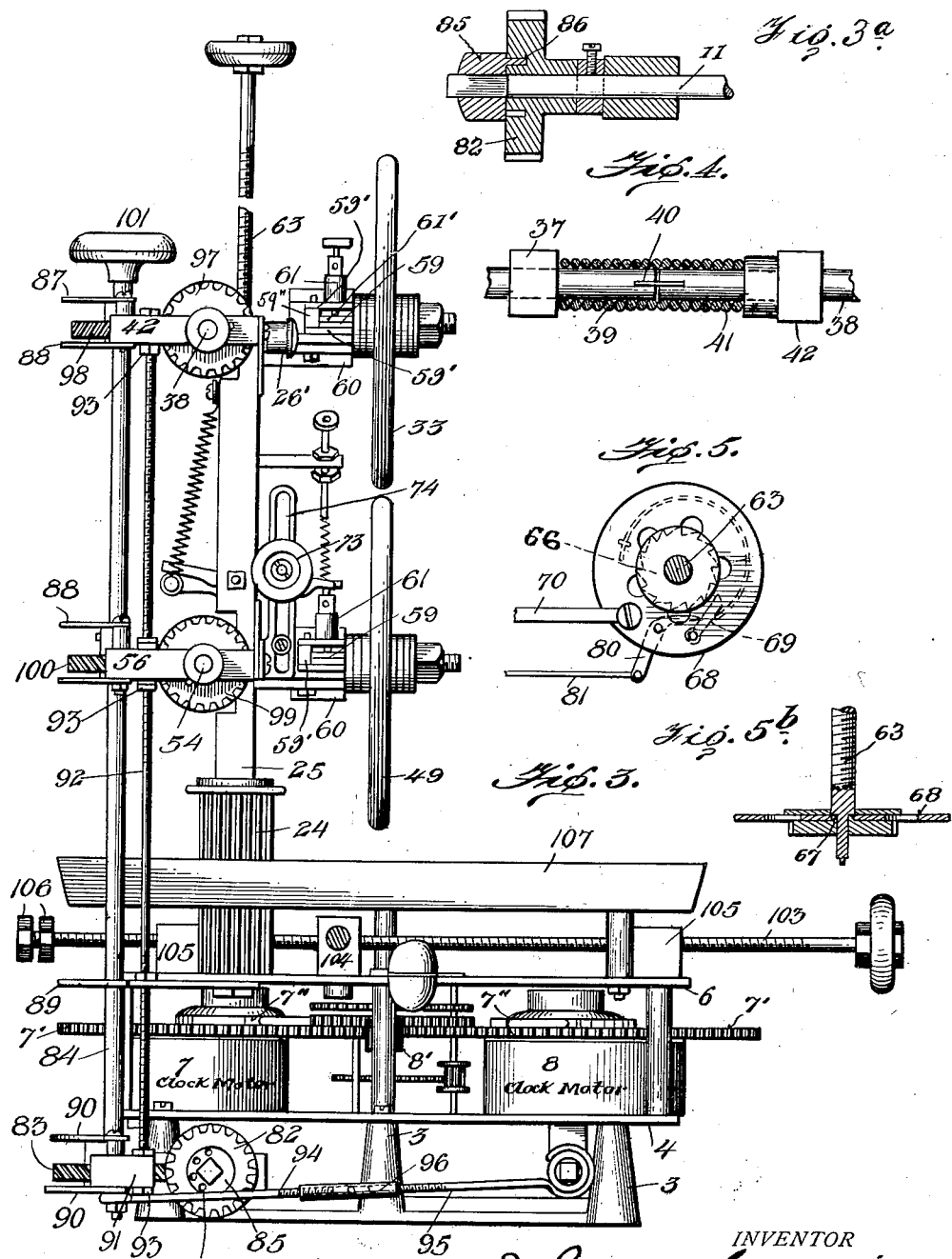

J. W. KENDRICK.
ARC LAMP.
APPLICATION FILED FEB. 17, 1910.
1,007,003.
Patented Oct. 24, 1911.
7 SHEETS—SHEET 4.
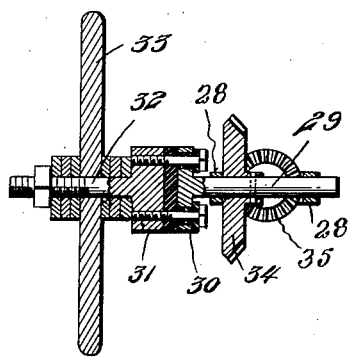
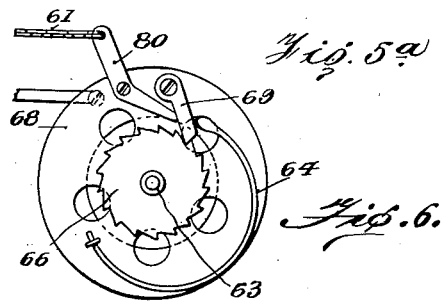
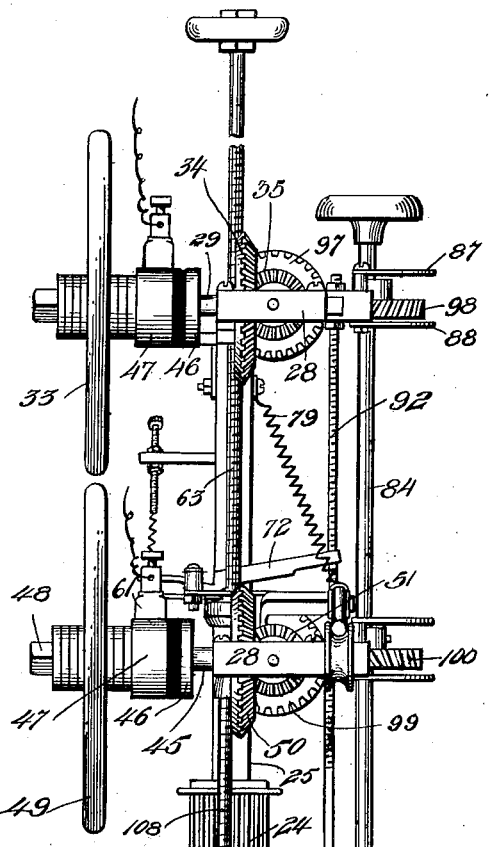
WITNESSES
John W. Kendrick
Attorney J. W. KENDRICK.
ARC LAMP.
APPLICATION FILED FEB. 17, 1910.
1,007,003.
Patented Oct. 24, 1911.
7 SHEETS—SHEET 5.
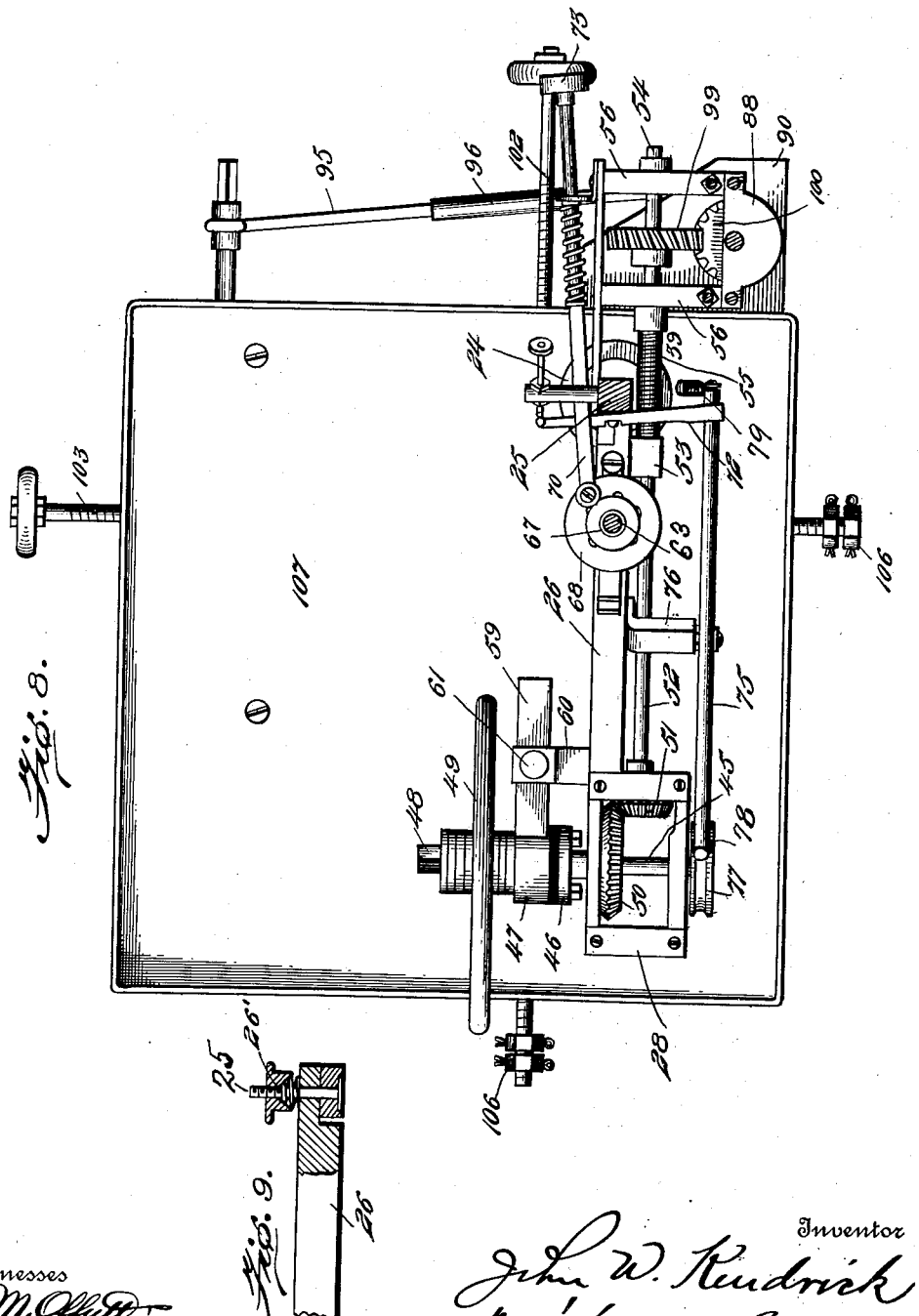

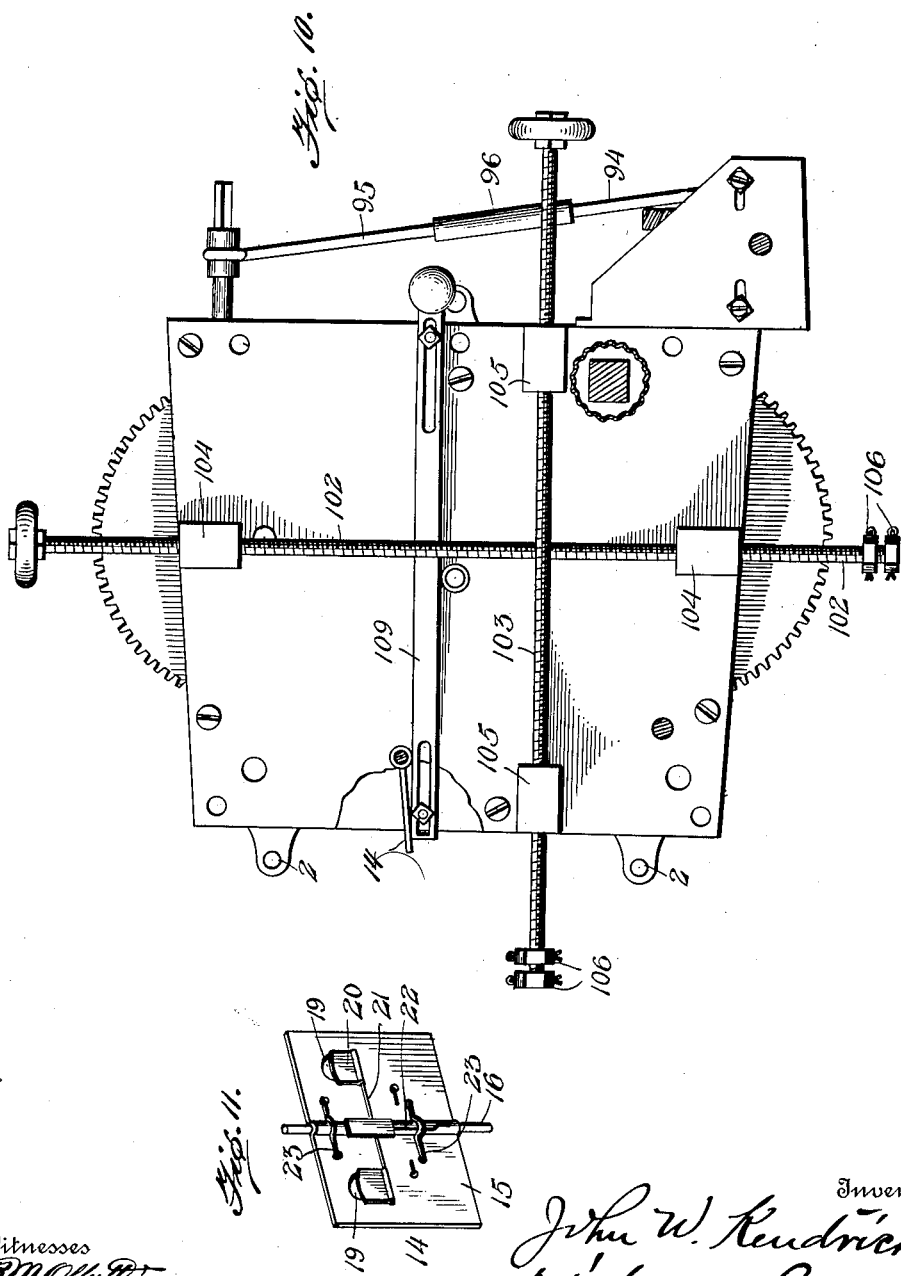

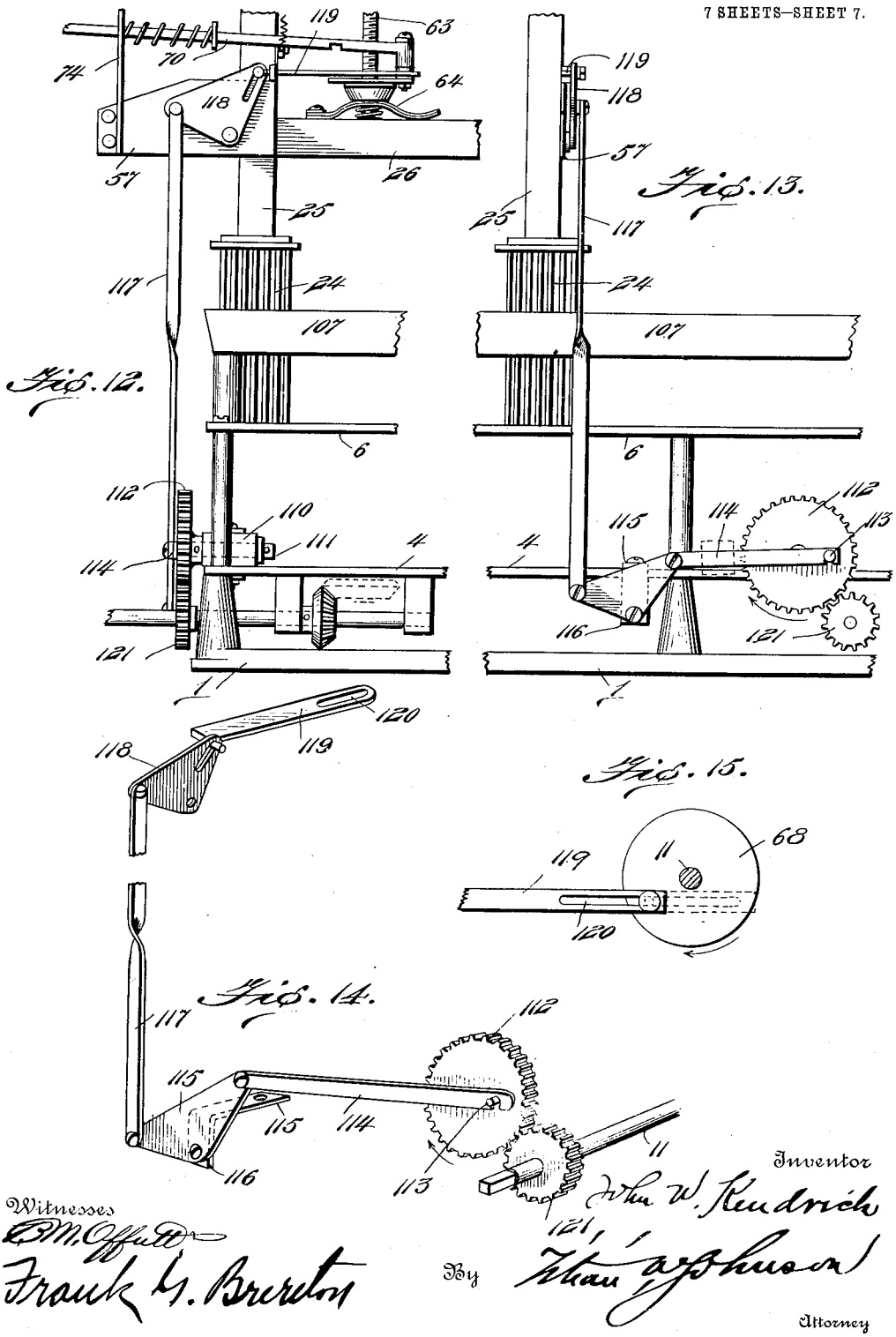

UNITED STATES PATENT OFFICE.

JOHN W. KENDRICK, OF FRANKLIN, PENNSYLVANIA, ASSIGNOR OF ONE-HALF TO IRA GRIFFEN, OF FRANKLIN, PENNSYLVANIA.

ARC-LAMP.

1,007,003.  Specification of Letters Patent. Patented Oct. 24, 1911.

Application filed February 17, 1910. Serial No. 544,463.

*To all whom it may concern:*

Be it known that I, JOHN W. KENDRICK, a citizen of the United States, residing at Franklin, in the county of Venango and State of Pennsylvania, have invented certain new and useful Improvements in Arc-Lamps, of which the following is a specification.

The invention relates to electric arc-lamps in general, but more particularly to that class of arc-lamps used for search-lights and in the exhibition of moving pictures; and it consists primarily of certain novel mechanism for revolving disk-electrodes, which are journaled in pivoted arms, and for intermittently feeding one of the electrodes toward the other at the end of each revolution thereof.

The invention further consists of certain novelly-constructed mechanism by which the revolution of the electrodes is so controlled or regulated that a uniform and steady movement of the same is obtained.

The invention still further consists of the peculiar and novel construction of certain other parts of the apparatus, their general arrangement and combination, as will be hereinafter more fully described in this specification, and briefly stated in the claims.

The chief object of the invention is to produce a lamp of the type mentioned, which is readily adaptable either as a search light or a suitable light-producing medium in exhibiting moving pictures.

Another object of the invention is to provide a lamp which, after the electrodes are set to arcing-position, will run for several hours without further attention, so that the attention of the operator may be given wholly to the manipulation of the search-light or the moving picture apparatus, as the case may be.

Other objects of the invention will become apparent upon a complete disclosure thereof.

In the drawings:—Figure 1 is an elevation of one side of the machine or lamp; Fig. 2 is a similar view of the opposite side; Fig. 3 is a front elevation; Fig. 3ª is a detail, in section, of the means for locking the gear-wheel on the winding-shaft thereto; Fig. 4 is a top plan view, partly in section, of one of the flexible connections by which the electrodes are permitted to have a vertical and lateral movement; Fig. 5 is a similar view of the mechanism for automatically feeding the upper electrode; Fig. 5ª is a bottom plan, somewhat enlarged of the same; Fig. 5ᵇ is an enlarged detail, in vertical section, of the setting-disk and ratchet wheel carried at the lower end of the feed-screw; Fig. 6 is a rear elevation of the lamp, the winding mechanism not being shown; Fig. 7 is a central, longitudinal section of one of the electrodes and its driving mechanism; Fig. 8 is a horizontal section taken between the electrode-carrying arms; Fig. 9 is a detail sectional view of the pivotal connection between one of the electrode-carrying arms and the supporting column; Fig. 10 is a plan view, partly in section, of the top plate of the motor-frame, showing the means for starting the generator or controller; Fig. 11 is a detached perspective view of the governor or controller; Fig. 12 is a front elevation of the mechanism for automatically setting the feeding mechanism; Fig. 13 is a side elevation of the same; Fig. 14 is a perspective view of the setting-mechanism, detached; and Fig. 15 is a detail thereof.

In the several views, the numeral 1 indicates a suitable base provided with bolt or screw-holes 2, through which suitable fastening means may be passed to secure the lamp to a suitable support, not shown. The base is provided with posts 3, upon which is secured a plate 4, and said plate is provided with posts 5 upon which is secured a top plate 6, the two plates constituting a framework for supporting the motor or driving-mechanism which, in the present instance, consists of a double clock-work mechanism driven by two springs 7 and 8, the winding post of each spring being journaled in the top and bottom plates 6 and 7. Each winding-post is provided at its lower end with a bevel gear-wheel 9, which meshes with a similar gear-wheel 10 on the winding-shaft 11, mounted in bearings 12 and 13, both shafts capable of being rotated, by a suitable key, to wind up the springs. By providing a double clock-work mechanism and driving it with two springs a powerful motor is obtained.

A governor or controller 14 is employed to obtain uniformity in the rate of speed of the clock-work, which governor consists, preferably of a fan 15 mounted on a shaft 16 journaled in the plates 4 and 6. The shaft, as shown in Fig. 1, is provided with a pinion 17, which meshes with a gear-wheel 18 mounted on a shaft 15', which gear-wheel, in turn, is driven by a gear-wheel 16' mounted on a shaft 16'', said gear-wheel 16' meshing with a pinion 17' mounted on the upper end of shaft 15'. The gear-wheel 16' is driven by a gear-wheel 117'', mounted on the post 7'''' and meshing with a pinion 18' on the shaft 16'', said post 7 being driven by the clock work. By a peculiar construction of the fan-governor, the rate of speed of the clock-work may be decreased or increased. This is accomplished by providing each wing of the fan with an opening 19, and arranging movable slides 20 to open and close the openings. The slides are mounted on a cross-bar 21, which is secured to a vertically-operated rod 22, slidable in a bearing 23 on the shaft 16, as shown in Fig. 11. If it should be found necessary to decrease the speed of travel of the clock-work, the rod 22 is moved upward to close the openings 19, which causes the governor to revolve at a lower rate of speed, and thereby the clock-work, a faster rate of speed being obtained by moving the rod 22 downward to uncover the openings.

The top plate of the motor frame-work is provided with a pillar or post 24, and passing through said pillar, and through the top-plate, is a square column 25, to which is pivoted two arms 26 and 27, the free end of each arm being provided with a yoke 28. Each arm is pivoted to the column 25 by a bolt 25', and adjustably held by a spring pressed adjusting-nut 26', as shown in Fig. 9. Journaled in the yoke of arm 27 is a shaft 29 having a head 30 to which is attached, by screws or bolts suitably insulated from said head, a contact-cylinder 31, said contact-cylinder being provided with an arm or short shaft 32 on which is secured a disk-electrode 33. The shaft 29 is provided with a bevel gear-wheel 34, which meshes with a similar gear-wheel 35 secured on the end of a shaft 36, which is journaled in one end of the yoke and a bearing 37 attached to the arm 27. The inner end of the shaft 36 is connected to a driving shaft 38 by a flexible connection 39, the adjacent ends of the two shafts being slitted or kerfed to receive a key 40, which joins the two shafts together, so that rotary motion imparted to shaft 38 may be transmitted to shaft 36, the ends of both shafts being incased by a coil spring 41, as shown in Fig. 4, thus permitting shaft 36 to have a vertical or rising and falling movement with arm 27. The shaft 38 is journaled in bearing-blocks 42 projecting from a bracket 43 secured to the column 25, said shaft 38 being provided with a gear-wheel 44, the purpose of which will be hereinafter explained.

Journaled in the yoke of arm 26, is a shaft 45 having a head 46 to which is attached, and suitably insulated therefrom, a contact-cylinder 47. The contact-cylinder 47 is also provided with an arm or short shaft 48 on which is secured a disk-electrode 49. Secured on the shaft 45 is a bevel gear-wheel 50, which meshes with a similar gear-wheel 51 secured on the end of a shaft 52, said shaft being journaled in one end of the yoke and a bearing 53 secured to the arm 26, and is flexibly connected to a driving shaft 54 by a flexible connection 55, similar in all respects to that shown in Fig. 4, so as to allow said shaft 52 to have the same rotary movement, and the same rising and falling movement that is possessed by the shaft 36. The shaft 54 is journaled in bearing-blocks 56, projecting from a bracket 57 secured to the column 25, and is provided with a gear-wheel 58, for a purpose hereinafter explained.

Each contact-cylinder is provided with a brush 59 supported between arms 59' of a box or bracket 59'' secured to an insulating-block 60 (shown in Fig. 3) which projects from the arm 26, (shown in Fig. 8), the brush being adjustably-secured by means of a binding-post 61, screwed into the upper arm of the bracket 59'', impinging against a clamping-plate 61'. The underside of the arm 27 is formed with an inverted V-shape recess 62, and is provided with a vertical slot 62' through which passes a feed-screw 63 for moving the upper electrode downward to adjust the distance between the electrodes to the normal arc length. The lower end of the feed-screw is supported in a cushioned seat 64, preferably consisting of a leaf-spring supported by a coil-spring, as shown in Figs. 1 and 2, said cushioned seat being for the purpose of permitting the electrodes to be brought into contact to start the arc. The feed-screw is provided with an adjustable wedge-shape nut 65, by means of which the upper electrode may be adjusted relatively to the lower electrode. To the lower end of the feed-screw, above its flexible or cushioned seat, is rigidly attached a ratchet wheel 66, which is provided with a hub 67 on which a setting-disk 68 is mounted, as shown in Figs. 5 and 5ᵇ, said disk being provided with a spring-pressed pawl 69, adapted to engage the teeth of the ratchet-wheel to lock the disk and ratchet wheel together. Pivoted to the disk is a spring-actuated holding rod 70, which is provided with a notch 71 adapted to be engaged by a trigger 72 fulcrumed on the column 25. One end of the trigger is connected by a spring 70' to an adjustable screw-threaded rod 71', which rod passes through a post 72' projecting from said column, and is held in adjusted position by jam-nuts 72''. The outer end of the rod 70 is provided with a small weight 73, to assist in maintaining its engagement with the trigger, and a guide 74 is provided for properly guiding its vertical movement. The outer end of the trigger rests upon one end of a tripping-rod 75, fulcrumed on a bracket 76 secured to the lower arm 26. The free or opposite end of the tripping-rod rests on a grooved tripping wheel 77 secured on the outer end of the shaft 45, said grooved wheel being provided with a notch or recess 78, into which said free end of the tripping-rod is caused to drop, by the tensioned force of a spring 79 attached to the other end of said tripping-rod, at the end of each revolution of the electrodes. Also pivoted to the disk 68 is a two-arm dog 80, one of said arms being adapted to engage the inner edge of the pawl 69, and the other arm provided with an operating-cord or chain 81, as shown in Fig. 5, which, when pulled, causes the dog to force said pawl out of engagement with the ratchet-wheel.

One of the winding-shafts 11, near its outer end, is provided with an oblique gear-wheel 82 which meshes with a similar gear-wheel 83 secured on the lower end of an operating-shaft 84, by means of which motion is imparted, through the action of the motor or clock-work, to the electrodes, said gear-wheel 82 which is loose on its shaft, being secured to said shaft by a lock-nut 85, having a pin 86 entering a hole in the face of said wheel. The upper portion of the operating-shaft 84 is journaled in plates 87, secured to the bearing-blocks 42, and in plates 88, secured to the bearing-blocks 56, the lower portion of said operating-shaft being journaled in a plate 89, secured to the upper plate of the motor frame, and in plate 90, secured to blocks 91, 91, one of which blocks is fastened to one of the posts 3 and forms an additional bearing for the outer end of one of the winding-shafts 11. Passing through the several sets of bearing-blocks and the plate 89, are screw-threaded rods 92, 92 which, by means of jam-nuts 93, hold said blocks and plate in firm position. As a further means for rendering the lower set of bearing-blocks more firm, a tie-rod, consisting of parts 94 and 95, joined together by a turn-buckle 96, may be employed to connect said set of bearing-blocks with the winding-shaft at the opposite side of the machine, as shown in Figs. 3, 8 and 9.

Secured on the shaft 38 is an oblique gear-wheel 97, which meshes with a similar gear-wheel 98, mounted on the operating-shaft, and secured on the shaft 54 is an oblique gear-wheel 99, meshing with a similar gear-wheel 100, mounted on said operating-shaft, motion being imparted to both electrodes by means of these gears, upon the rotation of the operating-shaft. The upper end of the operating shaft is provided with a knob 101, so that by removing lock-nut 85, said shaft may be rotated by hand to revolve the electrodes independently of the clock-work.

The lamp is provided with screw-threaded rods 102 and 103, operative in bearing-blocks 104, 104, and 105, 105, respectively, each rod being provided with jam-nuts 106, 106, by means of which attachment may be made to the frame or body of a search light or moving picture apparatus, so that when attached the position of the lamp may be changed at will by manipulating the rods. A suitable tray 107 is arranged to catch the dust or fine particles of carbon dropping from the electrodes.

In operating the lamp, the lower arm 26 is adjusted to bring the lower electrode to proper position, which is accomplished by means of a screw threaded adjusting-rod 108, after which the upper electrode is properly adjusted, relatively to the lower electrode, and by tapping the head of the feed-screw 63 the electrodes are brought to arcing-position. In adjusting the lower electrode, the grooved wheel 77 is brought to a position at which the extreme free end of the tripping-rod will rest just at the rear or far edge of the recessed or cut-away-portion of the wheel, as shown in Figs. 2 and 8; the trigger is then set by a pull on the cord or chain 81, which causes the dog 80 to force the pawl 69 out of engagement with the ratchet wheel 66, permitting the disk to be rotated, independently of the feed-screw 63, until the notch 71 of the spring-actuated rod 70 is engaged by the trigger 72, when the cord is released. The cord being released, the pawl 69 is forced back by its spring into engagement with the ratchet-wheel, thereby locking said disk and ratchet-wheel together. The governor, which is held inoperative by a slidable-rod 109, is set in motion by pushing said slidable-bar out of contact therewith. The electrodes being brought into contact, and the electric current turned on, the electrodes immediately begin to revolve and produce light. After a complete revolution of the electrodes, which lasts about five hours, the free end of the tripping-rod drops into the notch in the grooved tripping wheel, causing the trigger to release the spring-actuated rod 70, which immediately forces the disk 68, which is locked to the feed-screw through the medium of pawl and ratchet, to rotate said feed-screw and bring the upper electrode again to arcing-position with the lower electrode, the revolution of the electrodes continuing without interruption. When the free end of the tripping-rod has passed out of the notch in the grooved wheel, and is resting in the groove thereof, the tripping mechanism may be reset, as the several parts will then be in position for the operation, or the resetting may be delayed until just before the electrodes complete their second revolution, if desired. Instead of setting the mechanism for resetting the upper electrode by hand, I may prefer to do it automatically, and in Figs. 12, 13 and 14, I have shown such a mechanism attached to the lamp.

Attached to the lower plate of the motor-frame is a block 110, of insulating material, in which is journaled a shaft 111, and mounted on said shaft is a gear-wheel 112. The hub of the gear-wheel is provided with an eccentric-pin 113, to which is detachably-connected one end of a link 114, the other end of said link being pivotally-connected to one corner or arm of a rockable-plate 115, pivoted to a bracket 116, secured to the lower plate of the motor frame, as shown in Figs. 13 and 14. Pivoted to the other corner or arm of the rockable-plate is one end of a link 117, the other end of said link being pivoted to one corner or arm of a rockable-plate 118, which is pivoted to the bracket 57. Pivotally attached to the other corner or arm of the rockable-plate 118, is an operating-bar 119 provided with a slot 120 through which passes the pivot-pin of the spring-actuated rod 70, said operating-bar lying directly under said spring-actuated rod. Motion is imparted to gear-wheel 112 by means of a small gear-wheel 121 secured on one of the winding shafts 11.

In operation, motion being transmitted to gear-wheel 112, the eccentric-pin, being in the position shown in Fig. 14, will be caused to move in the direction of the arrow, at which time the pivot-pin of bar 70 will be in the outer end of the slot in the operating-bar 119. The movement of the eccentric-pin forces the link 114 forward, which causes the plate 115 to rock on its pivot, pulling link 117 and causing the plate 118 to rock on its pivot; as plate 118 rocks, the operating-bar will be drawn forward, the force exerted by said bar on the pivot pin of the spring actuated rod, causing the disk 68 to rotate, the spring-pressed pawl 69, in the meantime, slipping over the teeth of the ratchet-wheel. When gear-wheel 112 shall have made half a revolution, the notch 71, in the spring-actuated rod, will be engaged by the trigger 72, and the disk and feed-screw locked together by the action of the spring-pressed pawl engaging the ratchet-wheel, which, as before stated, is secured to the feed-screw. As gear-wheel 112 completes its revolution, the eccentric-pin will cause the link 114 to move rearwardly, and also the operating-bar, until the inner end of the slot in said bar engages the pivot-pin of the spring-actuated rod 70. At the instant this occurs, the free end of the tripping-rod 75 will have dropped into the recess 78, in the grooved wheel 77, tripping the trigger 72 and freeing the feed-screw, through the medium of the locked disk to the action of the spring-actuated rod 70, which forces the disk to rotate in the direction opposite to its former described rotation, and causes the feed-screw to turn in a direction to adjust or bring the upper electrode to arcing-position, the operation being repeated upon every revolution of the wheel 112.

Having thus fully described my invention, what I claim is:—

1. An arc-lamp, having in combination rotatable disk-electrodes journaled in pivoted arms, rotatable shafts for revolving the electrodes, said shafts being journaled in bearings attached to said arms, and driving-shafts flexibly coupled to the rotatable shafts, whereby the latter shafts may have, with the pivoted arms, a rising and falling movement, and the electrodes be revolved.

2. An arc-lamp, having in combination pivoted arms, a disk-electrode journaled in each arm, a rotatable shaft adapted to revolve the electrode, said shaft being journaled in suitable bearings attached to the arm, driving-shafts journaled in fixed bearings, and flexible connections between the driving and rotatable shafts whereby the pivoted arms may have a vertical movement.

3. An arc-lamp, having in combination pivoted arms, a disk-electrode journaled in each arm, the shaft of each electrode being connected with a beveled gear-wheel, a rotatable shaft carried by each arm, each shaft being provided with a gear-wheel in mesh with the gear-wheel connected with the electrode, driving-shafts flexibly-connected to the rotatable shafts, whereby the latter shafts and the pivoted arms may have a vertical movement, and means for rotating the driving-shafts to cause the rotation of the electrodes.

4. An arc-lamp, having in combination pivoted arms, a disk-electrode journaled in each arm, a rotatable shaft for each electrode, said shaft being composed of two parts coupled together by a flexible connection and provided with means for revolving the electrode, one of said parts being journaled in bearings carried by the pivoted arm and capable of a vertical movement with said arm, and the other part being journaled in fixed bearings, and means for driving the flexibly-coupled shafts to cause the revolution of the electrodes.

5. An arc-lamp, having in combination rotatable disk-electrodes journaled in pivoted arms, rotatable shafts journaled in bearings attached to said arms, driving shafts flexibly-coupled to the rotatable shafts, means for driving the flexibly-coupled shafts, and means for intermittently feeding one of the disk-electrodes.

6. An arc-lamp, having in combination pivoted arms, in each of which is journaled a disk-electrode, one of said arms capable of being adjusted to a fixed position, each arm being provided with a flexibly-coupled shaft adapted to revolve the disk-electrode journaled therein, means for driving the flexibly-coupled shafts, and means for revolving the electrodes.

7. An arc-lamp, having in combination pivoted arms in which are journaled disk-electrodes, one of said arms capable of being adjusted to a fixed position, each arm being provided with a flexibly-coupled shaft adapted to revolve the disk-electrode journaled therein, means for revolving the electrode, and means for intermittently feeding one of the electrodes.

8. An arc-lamp, having in combination pivoted arms in which are journaled disk-electrodes, one of said arms capable of being adjusted to a fixed position, each arm being provided with a flexible-coupled shaft adapted to revolve the disk-electrode journaled therein, automatically-operated means for intermittently feeding one of said disk-electrodes, means for revolving the electrodes, and means for driving the flexibly-coupled shafts.

9. An arc-lamp, having in combination pivoted arms in which are journaled disk-electrodes, one of said arms capable of being adjusted to a fixed position, each arm being provided with a flexibly-coupled shaft adapted to revolve the disk-electrode journaled therein, means for intermittently feeding one of said electrodes, means for revolving both electrodes, mechanism for setting the feeding means in feeding-position, and means for automatically freeing the setting mechanism whereby one of the electrodes may be moved, at the end of each revolution, to adjust the distance between the electrodes to normal arc-length.

10. An arc-lamp, having in combination pivoted arms in which are journaled disk-electrodes, and mechanism for moving one of the electrodes at the end of each revolution thereof, to adjust the distance between the electrodes to normal arc length, said mechanism comprising a cushion-seated screw-rod, a setting-disk, means for locking the disk to said rod, means for setting the disk and means for releasing said disk to cause the revolution of the screw-rod.

11. An arc-lamp, having in combination pivoted arms in which are journaled disk-electrodes, and a mechanism for moving one of the electrodes at the end of each revolution thereof, to adjust the distance between the electrodes to normal arc-length, said mechanism comprising a cushion-seated screw-rod, a setting-disk, means for automatically locking the disk to the screw-rod, and an automatically-operated trigger for holding said disk in locked position, and means for releasing the trigger.

12. An arc-lamp, having in combination pivoted arms in which are journaled disk-electrodes, and a mechanism for moving one of the electrodes, at the end of each revolution thereof, to adjust the distance between the electrodes to normal arc-length, said mechanism comprising a cushion-seated screw-rod, a setting-disk, means for locking the disk to the screw-rod, a trigger for holding said disk in locked position, a tripping-wheel and tripping-rod for releasing the trigger to cause the release of the disk, at the end of each revolution of the electrodes.

13. An arc-lamp, having in combination rotatable disk-electrodes journaled in pivoted arms, rotatable shafts for revolving the electrodes, said shafts being journaled in bearings attached to said arms, driving-shafts flexibly-coupled to the rotatable shafts, and a rod for operating the driving-shafts, said driving-shafts being provided with gear-wheels meshing with gear-wheels on said rod, whereby the flexibly-coupled shafts may be rotated to revolve the electrodes.

14. An arc-lamp, having in combination pivoted arms, disk-electrodes journaled in said arms, rotatable shafts adapted to revolve the electrodes, said shafts being journaled in suitable bearings attached to said arms, driving-shafts flexibly-coupled to the rotatable shafts, a rod for operating the driving-shafts, said driving-shafts being provided with gear-wheels meshing with gear-wheels on said rod, and means for operating the rod, whereby the flexibly-coupled shafts are rotated to cause the revolution of the disk-electrodes.

15. An arc-lamp, having in combination pivoted arms in which are journaled disk-electrodes provided with gear-wheels, rotatable shafts provided with gear-wheels meshing with the gear-wheels of the electrodes, said shafts being carried by said arms, driving-shafts flexibly-coupled to the rotatable shafts, means for rotating the flexibly-coupled shafts, and means for intermittently feeding one of the disk-electrodes.

16. An arc-lamp, having in combination pivoted arms in which are journaled disk-electrodes provided with gear-wheels, rotatable shafts provided with gear-wheels meshing with the gear-wheels of the electrodes, said shafts being carried by said arms, driving-shafts flexibly-coupled to the rotatable shafts, and a rod adapted to rotate the shafts.

17. An arc-lamp, having in combination pivoted arms in which are journaled disk-electrodes provided with gear-wheels, rotatable shafts carried by said arms, said shafts being provided with gear-wheels meshing with the gear-wheels of the electrodes, driving shafts flexibly-coupled to the rotatable shafts, a rod adapted to operate the flexible-coupled shafts, a motor for driving the rod, mechanism for intermittently feeding one of the electrodes, and mechanism for setting the feeding-mechanism to feeding position.

18. An arc-lamp, having in combination pivoted arms in which are journaled disk-electrodes provided with gear-wheels, rotatable shafts carried by said arms, said shaft being provided with gear-wheels meshing with the gear-wheels of the electrodes, driving-shafts flexibly-coupled to the rotatable shafts, a rod adapted to operate the flexibly-coupled shafts, a motor for driving the rod, mechanism for intermittently feeding one of the electrodes, mechanism for setting the feeding-mechanism, and means for automatically releasing the setting-mechanism at the end of each revolution of the electrodes.

19. An arc-lamp, having in combination pivoted arms in which are journaled disk-electrodes, flexibly-coupled shafts arranged to revolve the electrodes, one part of the flexibly-controlled shafts being carried by the arms, means for rotating said shafts, and a mechanism for feeding one of the electrodes to arcing position, said mechanism comprising a cushion-seated screw-rod, a setting-disk, means for automatically locking said disk to the rod, a holding-rod, a trigger arranged to engage the holding-rod to hold the disk in locked position, and automatically-operated means for releasing the trigger to permit the disk to turn the screw-rod, and thereby feed the electrode.

In testimony whereof I affix my signature in presence of two witnesses.

JOHN W. KENDRICK.

Witnesses:
  IRA GRIFFEN,
  WM. B. GRIFFEN.